FIG. 1
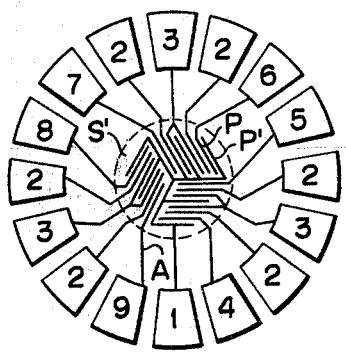
FIG. 4
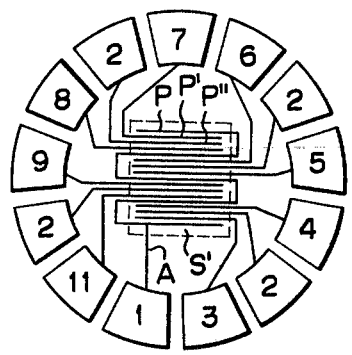
FIG. 2A
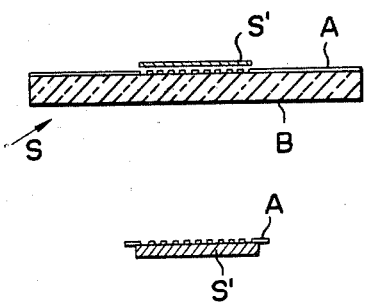
FIG. 3
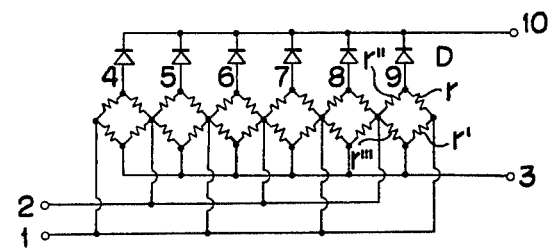
FIG. 2B
FIG. 5
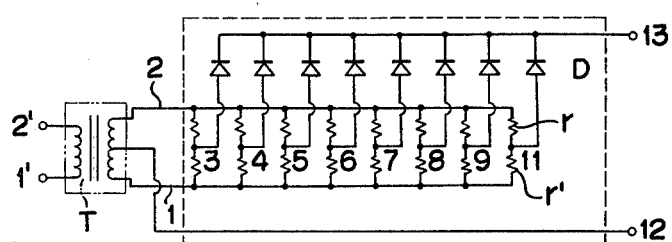
INVENTOR.
TAKEO YAMADA

INVENTOR.
TAKEO YAMADA

INVENTOR.
TAKEO YAMADA

INVENTOR.
TAKEO YAMADA

United States Patent Office 3,511,155
Patented May 12, 1970

3,511,155
AUTOMATIC FOCUSSING MEANS OF OPTICAL INSTRUMENTS AND STRUCTURE OF THE LIGHT RECEIVING PORTION THEREOF
Takeo Yamada, Tokyo, Japan, assignor to Nippon Kogaku K.K., Chuo-ku, Tokyo, Japan, a corporation of Japan
Filed June 30, 1966, Ser. No. 561,903
Claims priority, application Japan, July 14, 1965, 40/42,017; July 19, 1965, 40/43,200, 40/43,201
Int. Cl. G03b 3/10
U.S. Cl. 95—44       12 Claims

ABSTRACT OF THE DISCLOSURE

The method of automatically focusing optical instruments and the apparatus therefor is provided wherein a photoconductive surface is finely divided into a plurality of discrete portions. Thereafter according to one embodiment of the present invention, a plurality of resistance bridges are formed out of such discrete portions wherein each of said resistance bridges includes four resistance arms and each arm thereof includes one of such discrete portions. The photoconductive surface is then placed in the optical path of radiant energy refracted from the lens means of the associated optical instrument and any imbalances present in the resistance bridges formed are relied upon to energize means for adjusting the axial position of said lens means.

---

The present invention relates generally to optical instruments such as cameras and specifically to a means for automatically focusing the image of an object on a particular surface.

It is an object of this invention to provide a light receiving device for automatically focusing optical instruments such as cameras by finely dividing a photo conductive plane by a number of electrodes, forming the fine divisions into respectively independent fine photosensitive portions for sensing the intensity of light, and forming a number of bridge circuits with these portions.

Another object of this invention is to provide, on the image forming surface of an optical system an automatic focusing means comprising a photoconductive cell having a light receiving portion divided into respectively independent fine photosensitive portions, as mentioned above, to thereby detect the unbalance of the respective bridge circuits formed by the respective divisions of the cell, and lead the said detected unbalance to a reversible motor driving means connected to the driving mechanism of the image forming lens to automatically indicate the position for forming a focused image of a viewed object or to superpose a formed image on an image forming aperture.

A still further object of this invention is to provide a means for automatic focusing by finely dividing a light receiving surface into a number of divisions according to a predetermined directional pattern, forming the divisions as independent photosensitive portions, forming a number of bridge circuits with the respective divisions, and providing a slit mechanism on an adjacent surface of the light receiving surface or a conjugate plane thereof, to scan in a direction normal to the direction of the said pattern.

The above as well as other objects and advantages of this invention will be made apparent from the explanations given in accordance with the attached drawings which show the embodiment of this invention and wherein:

FIG. 1 shows the arrangement of electrodes of the photoconductive cells used in this invention;

FIGS. 2A and B are cross-sectional views of the electrodes of FIG. 1;

FIG. 3 is a circuit diagram of the photoconductive cell of FIG. 1;

FIG. 4 shows a second arrangement of the electrodes of photoconductive cells for use in this invention;

FIG. 5 is a circuit diagram showing the circuitry of the electrodes of FIG. 4;

FIGS. 15, 16, 17(i)–17(vii) and 18(i)–18(iii) show the focusing effect of the automatic focusing means of the instant invention when the viewed object is a check pattern.

Figure 6:
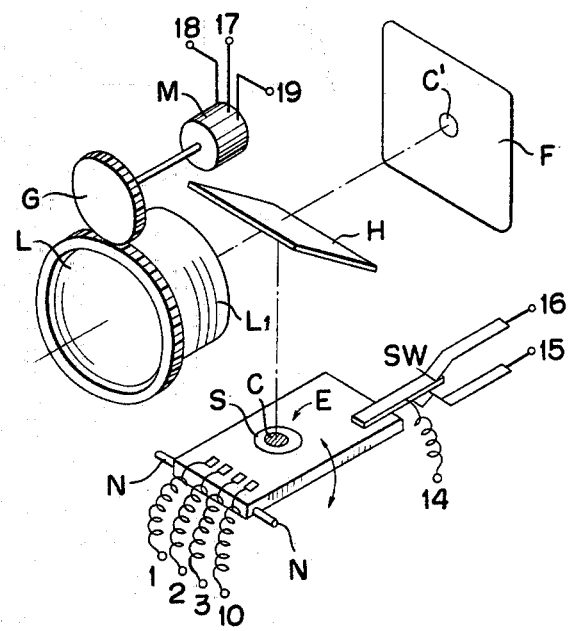
FIG. 6 shows an embodiment of the automatically focusing means wherein the photoconductive cell of FIG. 1 is used.

There is shown in FIGS. 1 and 2 a photoconductive cell for use in the instant invention, comprising a base plate B of steatite or melted quartz having light receiving portions of electrodes P and P' mounted thereon. Photoconductor S' is made of suitable material such as CdS or CdSe. Light receiving portions of electrodes P and P' are made to the same size as the circle of least confusion of the objective lens, and they are appropriately arranged so as to decrease the directionality generated by the shape of the viewed object. Terminals 1 to 9 are electrically connected to electrodes A and formed of a thin film of gold or other appropriate conductor material. The base plate B is generally prepared by known methods such as photo etching or the like after evaporation.

FIG. 3 shows the circuit diagram of the photoconductor cell of FIG. 1 wherein focusing detection is accomplished by connecting the light receiving portions of electrodes P and P' as a series of Wheatstone bridges using the resistances $r$ to $r'''$. Thus it can be seen that when potential is applied between the terminals 1 and 2 of FIG. 3, and there exists some unbalanced bridges, a positive or negative potential is generated at the terminal of the unbalanced bridges with respect to terminal 3. Terminals 4 to 9 are respectively connected to terminal 10 through diodes D, thus when the detecting current is sensed at terminals 3 and 10, the outputs of the respective bridges are correctly detected without balancing positive and negative with respect to each other. Therefore, when alternating current is applied between terminals 1 and 2, an output can be obtained between 3 and 10 if any unbalance exists in any of the bridges.

FIG. 4 shows a second embodiment of a photoconductive cell for use in the instant invention, wherein the electrodes P and P' of the light receiving portions are arranged in a stripe form pattern, the fundamental spacing, however, being the same as that in the embodiment of FIG. 1.

FIG. 5 shows a circuit diagram for the photoconductive cell of FIG. 4, wherein input terminals 1' and 2' are connected to the primary of transformer T. Terminals 1 through 9 and 11 are connected to the electrodes of light receiving portions P and P' through electrodes A. Output terminal 12 is connected to the mid-point of the secondary winding of transformer T, consequently, when alternating current is applied between the terminals 1' and 2', a potential is obtained between terminals 12 and 13 if there are unbalanced resistances between the respective sets of electrodes $r \ldots r'$.

FIG. 6 shows an embodiment of the automatic focusing device of the instant invention, wherein the photoconductive cell of FIG. 1 is used, and comprising an objective lens L having a helicoid L' for focusing, a semitransparent mirror for reflecting a certain portion of the object light to the photoconductive cell, a photoconductive cell according to the instant invention and an aperture F for forming an image of the observed object. When the photoconductor is CdS, reflecting means H may be a semi-transparent mirror. When the photoconductive cell is CdSe, however, the photosensitive zone is in the near infrared portion of the spectrum and a multilayer thin film mirror which selectively reflects the near infrared rays and passes the visible rays is advantageously used in place of the semi-transparent mirror in that the amount of light received with respect to the visible portion at the aperture S is not decreased. S is a photoconductive cell as shown in FIG. 1, the effective portion of which is designated at C. The region on an aperture F which corresponds to the effective region on photoconductive cell S is designated as C'. Effective region C' is made smaller than the aperture F, in order that when an object is photographed, the object not always being at the same distance from the aperture, only a portion of the object is used as the target for focusing.

Photoconductive cell S is mounted on a moving plate E having circuitry, as diagrammed in FIG. 3, mounted thereon. Plate E is arranged so as to be vibrated around the axis N—N within a distance of $HC=HC'\pm Y$ at a speed in the range of several tens of cycles per second, where Y is adjusted to be equal to the axial displacement length of the lens L or larger. Switch SW detects the position of moving plate E and when the value of HC is larger than the value of HC', contacts 14 and 15 are connected. When the value of HC is smaller than the value of HC', the contacts 14 and 16 are connected. When the values HC and HC' are equal, the circuit is open. Terminals 1, 2, 3 and 10 of FIG. 7 correspond to terminals 1, 2, 3 and 10 of FIG. 3, respectively. A lens operating means comprising a gear G for rotating the lens L and servo motor or a combination of motor and mechanically reversible rotating device with an electromagnetic clutch is so arranged that when potential exists between the terminals 17 and 18, the motor operates through gear G to rotate the lens L in one direction and when potential exists across terminals 17 and 19 the motor operates in the opposite direction to correspondingly rotate lens L thereby moving the lens axially forward or backward.

Figure 7:
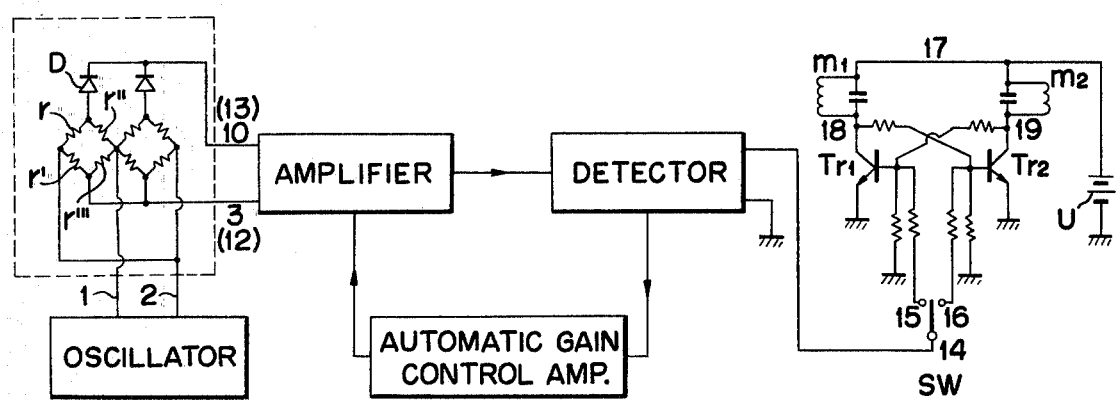
FIG. 7 is a circuit diagram of the automatic focusing means of FIG. 6.

FIG. 7 is a circuit diagram of the automatic focusing device of FIG. 6 having the circuitry of the photoelectric light receiving portion outlined by a dotted line. The resistances $r$ to $r''$ of FIG. 7 correspond to those resistances of FIG. 3. An oscillator is connected between the terminals 1 and 2, and several kc. of alternating current is generated and applied thereto. A class C amplifier is connected to the output terminals 3 and 10 of the light receiving circuitry, and a wave detector and automatic gain control amplifier are connected as shown in FIG. 7 (the time constant being several tens of milliseconds). The detector is connected to switch SW, terminals 15 and 16 of which are connected through suitable resistances to transistors $Tr_1$ and $Tr_2$ which form a bistable multivibrator. The coils M1 and M2 can be the field coils of servo motor M as seen in FIG. 6, or the solenoid coils of a magnetic clutch, the terminals 17, 18 and 19 corresponding to the terminals 17, 18 and 19 of FIG. 6.

As can be seen in FIG. 6, the image of an observed object is collected by the lens L and partially reflected by semi-transparent mirror H to be focused on surfaces E and F respectively.

Figure 8:
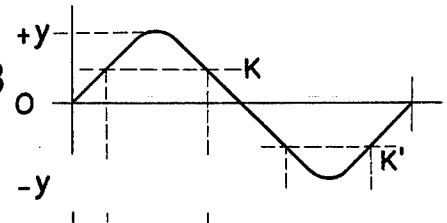
FIG. 8 represents the movement in the optical axis of the photoconductive cell of the focusing means of FIG. 6.
Figure 9:
FIG. 9 is a diagram of output voltage obtained between the terminals 3 and 10 of the focusing means of FIG. 6.
Figure 10:
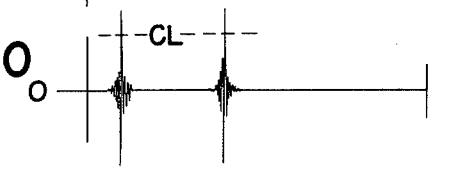
FIG. 10 is a diagram of the output of the amplifier of FIG. 7.

Referring now to FIG. 8, the images of two objects in one view are formed at $k$ and $k'$ in the neighborhood of the photoconductive cell S, which vibrates between $+y$ and $-y$. The output generated between the terminals 3 and 10, is shown in FIG. 9. In other words, since the contrast of the respective portions of the image is maximum at the position of the image, the difference of the resistance of the photoconductive resistances $r-r'''$ becomes the maximum (generally speaking, bridge becomes most unbalanced), and the output generated between the terminals 3 and 10 becomes maximum. The resulting output is amplified by the class C amplifier as is shown in FIG. 10, and at a certain level CL, it is cut and detected, thus making it possible to obtain the negative pulses $X_1$, $X_2$. In this case, if the output caused by the image at the point $k$ is larger than that of the point $k'$, the output caused by the image of the point $k'$ does not affect the wave detector as is apparent from FIG. 9 to FIG. 11, and therefore, the output pulse of the wave detector is generated only by the image at the point $k$, for example, of the person who becomes the subject of the picture, and it is not affected by the image at the point $k'$, such as the background.

Thereafter the pulse enters into switch SW, and in this instance the contact 14 being connected to the contact 16, the said pulses $X_1$ and $X_2$ enter the base of the right side transistor $Tr_2$. These pulses deactivate transistor $Tr_2$ if its activated. Transistor $Tr_1$ is activated to apply voltage between the terminals 17 and 18, the lens L is rotated by the gear G and the image at the point $k$ is shifted towards the point O (the horizontal axis). Thus, when the relation between the vibrating speed of the moving plate E and the reciprocating speed of the lens L is appropriately selected, the lens L moves back and forth so as to keep the image, which becomes the subject of the picture, at a little in front of or at the back of the position of aperture F to achieve automatic focusing.

As mentioned above, when the structure of the light receiving portion of the present invention is used, it is possible to detect the focusing point of the lens by simply comparing the amount of light which comes into the respective divisions of the photoconductive cell. Thus, the automatic focusing device is simple and sensitivity is remarkably high.

As for the size of the photoconductive cell it can cover the entire aperture zone as a matter of course.

Figure 12:
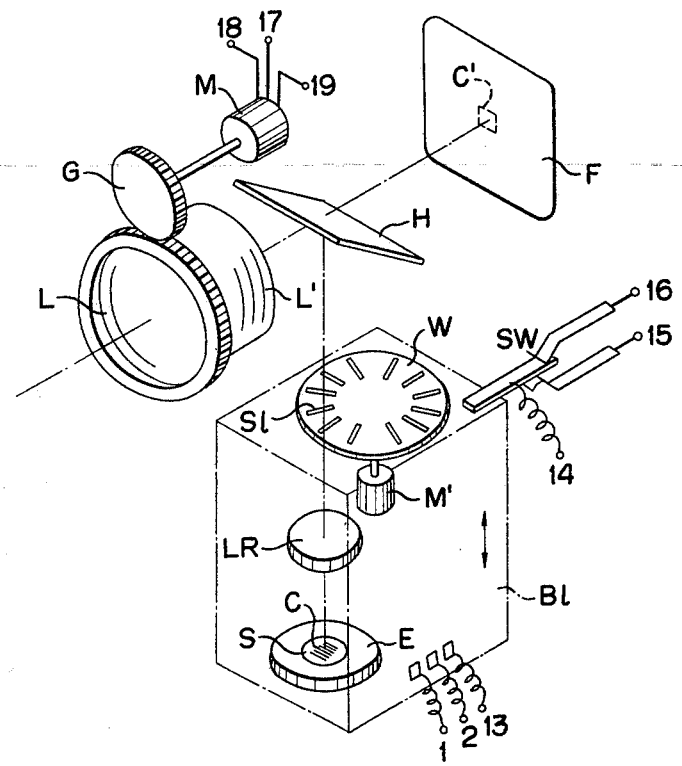
FIG. 12 show a second embodiment of the automatic focusing means using the photoconductive cell of FIG. 4.

FIG. 12 is an embodiment of the automatic focusing means wherein the cell of FIG. 4 and the circuitry of FIG. 5 are used, and wherein L is an objective lens, L' is a helicoid for focusing, F is the image forming aperture of the said lens L, and H is either a semi-transparent mirror or a multi-layer thin film mirror as described infra.

S is a photoconductive cell as shown in FIG. 4, C being the effective portion thereof corresponding to C' of the aperture F. E is a base member having circuitry thereon as shown in the portion outlined by the dotted line of FIG. 5, and is connected to terminals 1, 2 and 13. Disk W, rotated by electric motor M', has slits S1 thereon for scanning the image reflected from mirror H. Relay lens LR forms the reflected image on C by overlapping the image of the object from L on the image of the slit S1. C' is made smaller than C as aforementioned.

It is obvious that when the disk W and cell S are separated by a distance no greater than the focal length of L, the relay lens LR can be omitted.

The portion B1 which is surrounded by the chained line in the drawing is a structure comprising M', W, LR, F and it is made so as to vibrate within the distance $HS1 = HC' \pm y$ in the direction shown by arrows at the speed of several ten cycles per seconds. The value of $y$ above is equal to or somewhat larger than the axial displacement length of the lens.

Switch SW detects the position of the said block B1, where HC1 is smaller than HC' the terminals 14 and 16 are connected, and where HS1 is larger than HC', the terminals 14 and 15 are connected, the others being respectively without contact.

G is the gear for rotating lens L; M is a servo motor, or a combination motor and mechanical reverse rotation mechanism and electromagnetic clutch for driving the said gear G and it is so devised as to advance the lens L when potential is applied between the terminals 17 and 19, and to withdraw the lens L when potential is applied between the terminals 17 and 18.

Figure 13:
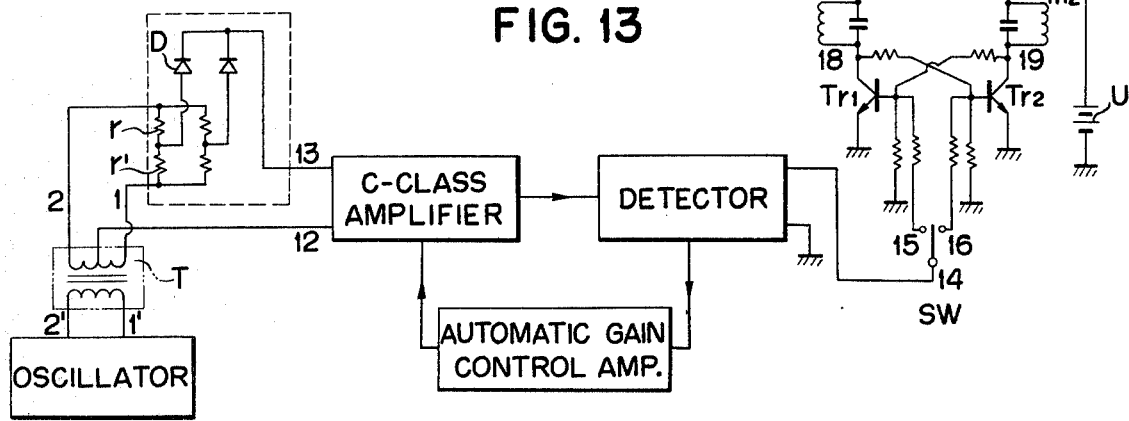
FIG. 13 is a circuit diagram of automatic focusing means of FIG. 12.

The circuit diagram of FIG. 13 shows the electrical system which is connected to the mechanical portion of FIG. 12, and the portion outlined by the dotted line in the drawing is arranged on base E of FIG. 12 and $r$ and $r''$ correspond to those of FIG. 5. An oscillator is connected to the primary side of tranformer T and so as to impress a current of several KC on the terminals 1' and 2' on the output side terminals 12 and 13, a class C amplifier, a wave detector, and an automatic gain control amplifier having time constant of several ten milliseconds are connected to the output terminals 12 and 13. Switch SW corresponds to that of FIG. 12, and $Tr_1$ and $Tr_2$ are transistors which form the bistable multivibrator together with other electrical elements. U is the cell, and $m_1$ and $m_2$ are either the field coils of the servo motor as is shown in FIG. 12 or the solenoid coils of magnetic clutch, and the terminals 17, 18 and 19 correspond to those of FIG. 12.

In operation, the system as shown in FIGS. 12 and 13, collects light rays from a target object by lens L, which light rays are divided by the semi-transparent mirror H, and an image thereof is formed on F and an image thereof is formed on the surface of W. The image formed on the surface of W is scanned by the slit S1 and reformed on C in the form of fine strips.

Figure 14:
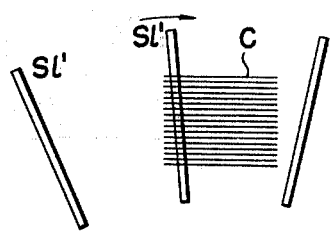
FIG. 14 represents the scanning state of the slit image on the photoconductive surface of the automatic focusing means of FIG. 12.

FIG. 14 shows the movement of the image S1' of the slit S1 on the surface of C. The forms of the electrode A of FIG. 4 and the movement of the slit S1 are combined in this embodiment, and it is operated so as to simultaneously scan the surface of the image by a number of small divisions of a slit finely divided in the lengthwise direction. This moving operation is the same as shown in FIG. 8 to FIG. 11.

Namely, FIG. 8 shows the position of the photoconductive cell S related to the image of the object. Cell S vibrates between $+y$ and $-y$ about the position on the optical axis corresponding to the position of the optical aperture F.

Figure 11:
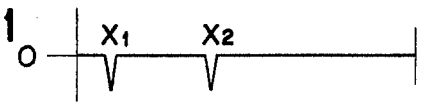
FIG. 11 is a diagram of the output of the wave detector of FIG. 7.
Figure 15:
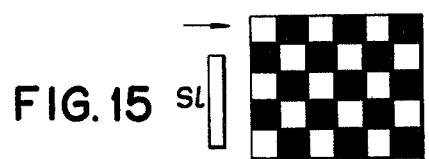
Figure 16:
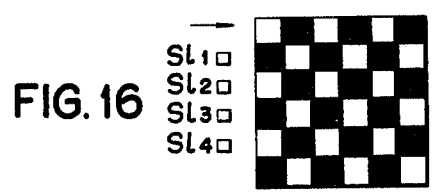
Figure 17:
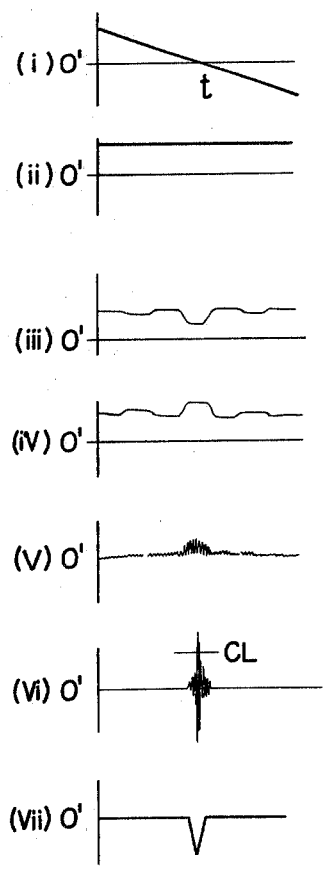

When two objects are positioned in front of as well as in back of the cell, and where the images thereof are a $k$ and $k'$, the output between the terminals 12 and 13 is shown in the diagram of FIG. 9. In other words, at the image forming positions the contrast of the respective images becomes maximum, the difference of the respective sets of resistances such as the resistances of the photoconductors $r$ and $r'$ becomes maximum, the electric bridge becomes most unbalanced, and the output generated between the terminals 12 and 13 becomes maximum. The output thus obtained is amplified as shown in FIG. 10 by means of the class C amplifier, cut at a certain level C1 and wave detected, and the negative pulses $X_1$ and $X_2$ as shown in FIG. 11 are obtained. The lens is then brought into focus as previously described.

Where the object has the check pattern as is shown in FIGS. 15 and 16, the output obtained using the combination of a scanning slit and a single light receiving portion which can be observed in the conventional devices, becomes almost zero. In FIG. 17, the horizontal axis represents time, and the vertical axis represents the position for forming the image. The point C' is set to the slit position as shown in the diagram (i), the image agrees with the slit surface at the time $t$ when the image is shifted forward from the rear, but in this case, as seen from the diagram (ii), the amount of light arriving at the light receiving portion is not related to the image forming as is shown by the vertical line, and therefore, the output for focusing cannot be obtained. In other words, even in case the image is out of focus, or in case the image is sharply focused, the amount of the light passing through the slit is averaged by the length of the slit.

However, in the present device, the light receiving portion is the photoconductor between the electrodes P and P' as shown in FIG. 4, and since the respective portions are operated as the independent light sensitive portions, the slit S1 is divided into $S1_1$, $S1_2$ . . . as shown in FIG. 16 insofar as the functions thereof are concerned, the resistances between the respective electrodes change as shown in the vertical lines of the diagrams (iii) and (iv) of FIG. 17. Besides, the respective electrodes are connected as shown in FIG. 5, the output for focusing can be obtained as shown by the diagram (v) between the terminals 12 and 13 when the alternating current potential is applied between the terminals 1' and 2', and therefore, this output is amplified and detected as mentioned above, it is possible to obtain the pulse for focusing even if the object is in a check pattern. The above mentioned operations of the present device are similar to those of a television camera tube, such as videcon tube, but in an automatic focusing device for a camera, it is not always necessary to detect the form and the position of the images, and it is necessary only to find the point where the contrast between the close picture elements becomes maximum.

Figure 18:
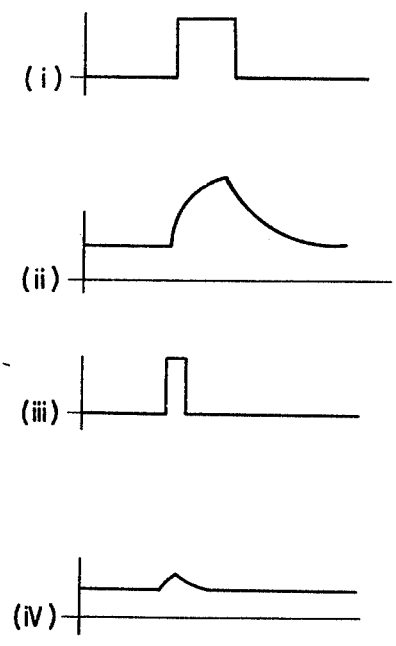

The change of the amount of light received by the light receiving portion at one optical point, is shown by the diagrams (i) and (iii) of FIG. 18, and the change of conductance of the photoconductor generated thereby is shown in the diagrams (ii) and (iv). It is apparent from the diagrams that where the scanning speed is small, the change of the amount of light is as shown by the diagram (i), and the change of conductance is as shown by the diagram (ii); and in case the scanning speed is greater, the change of the amount of light is as shown in the diagram (iii), and the change of conductance is as shown in the diagram (iv). In other words, generally speaking, the photoconductor requires a certain amount of time for the storage and discharge of the signal caused by the light, and therefore, the lower the scanning speed, the more advantageous result is expected, and in accordance with the present device, it is possible to reduce the scanning speed in inverse proportion with the number of portions of the divided photoconductor and therefore, it is possible to produce greater output which will simplify the amplifier.

The present device is different from the conventional devices wherein a photoconductor is placed at a position where the light flux is increased after passing the slit. With the present device, the image of the object is focused on the photoconductor; the illumination on the photoconductor can be increased, and the time for storage and discharge of the signal of the photoconductor can be reduced, thereby the output can be further increased.

It is needless to mention here that the electric circuit as shown in FIG. 3 can also be used.

What is claimed is:
1. A method for automatically focusing an optical instrument comprising the steps of:
    finely dividing a continuous photoconductive surface into a plurality of discrete photosensitive divisions;
    collecting light through an image forming lens;
    refracting a portion of said light onto said photoconductive surface;

sensing said refracted portion of said light with said plurality of discrete photosensitive divisions;
applying electrical energy continuously to said discrete photosensitive divisions while said refracted portion is being sensed;
comparing the magnitudes of electrical impulses derived from each of said plurality of discrete photosensitive divisions; and
axially displacing said lens in response to imbalances in said magnitudes.

2. Automatic focusing apparatus for optical instruments comprising:
lens means adapted to receive radiant energy and to focus the same;
means for axially displacing said lens means to thereby adjust the focus thereof;
a continuous photoconductive light receiving surface means adapted to receive a portion of the radiant energy emanating from said lens means and to vary its electrical conductivity in response to the intensity of the radiant energy impingement thereon;
means for finely dividing said continuous photoconductive light receiving surface means into a number of divisions, each of said divisions thereby constituting discrete, variable resistance means;
means for connecting a plurality of said divisions into at least one resistance bridge means as discrete resistance arms thereof;
input terminal means coupled to each resistance bridge means thus formed, said input terminal means being adapted to receive energizing potential and to apply such energizing potential to said resistance bridge means; and
means responsive to an unbalanced condition in said resistance bridge means for controlling said means for axially displacing said lens means.

3. The apparatus of claim 1 additionally comprising means for refracting a portion of the radiant energy received by said lens means to thereby cause such portion of said radiant energy to impinge upon said photoconductive light receiving means.

4. The apparatus of claim 3 wherein said means for refracting a portion of the radiant energy received by said lens means comprises thin film mirror means.

5. The apparatus of claim 3 wherein said means for refracting a portion of the radiant energy received by said lens means comprises semi-transparent mirror means.

6. The apparatus of claim 3 additionally comprising means, optically interposed in the light path between said lens and said photoconductive light receiving surface means, for scanning said portion of radiant energy in a direction normal to the planar surface of said photoconductive light receiving means.

7. The apparatus of claim 1 wherein said at least one resistance bridge means includes at least four resistive arms therein, each of said resistive arms including one of said divisions.

8. The apparatus of claim 1 wherein said means for connecting a plurality of said division into at least one resistance bridge means includes means for connecting a plurality of said divisions into a plurality of resistance bridge means.

9. The apparatus of claim 8 wherein said plurality of resistance bridge means includes at least four resistance arms therein, each of said resistive arms including one of said divisions.

10. The apparatus of claim 9 additionally comprising rectifier means interposed between an output terminal of each said resistance bridge means and said means responsive to an unbalanced condition in said resistance bridge means.

11. The apparatus of claim 10 wherein each of said plurality of resistance bridge means includes at least two resistance arms therein containing divisions common to all of the other resistance bridge means of said plurality.

12. The apparatus of claim 11 wherein each of said number of divisions comprises a pair of electrodes present in said photoconductive light receiving surface means and the portion of said photoconductive light receiving surface means intermediate said electrodes.

References Cited

UNITED STATES PATENTS

| | | |
|---|---|---|
| 2,838,600 | 6/1958 | Salinger. |
| 3,041,459 | 6/1962 | Greene. |
| 3,333,105 | 7/1967 | Kossakowski. |
| 3,274,913 | 9/1966 | Biedermann _____ 95—44 |

DAVID SCHONBERG, Primary Examiner

M. J. TOKAR, Assistant Examiner

U.S. Cl. X.R.

356—4, 125